United States Patent
Maeshiba

[15] 3,700,112
[45] Oct. 24, 1972

[54] HOSE COUPLING

[72] Inventor: Sozaburo Maeshiba, 33-32,-4 chome, Hakataekimae, Fukuoka, Japan

[22] Filed: June 8, 1970

[21] Appl. No.: 44,198

[52] U.S. Cl. .................. 210/445, 285/111, 285/317, 210/448
[51] Int. Cl. .............................................. C02c 1/14
[58] Field of Search ............. 285/317, 314, 111, 112; 210/445, 446, 448

[56] References Cited

UNITED STATES PATENTS

| | | | |
|---|---|---|---|
| 2,068,858 | 1/1937 | Jones | 210/448 X |
| 593,191 | 11/1897 | Bernhardt | 285/317 X |
| 1,150,420 | 8/1915 | Davis et al. | 285/317 X |
| 999,169 | 7/1911 | Jones | 285/320 X |
| 593,190 | 11/1897 | Bernhardt | 285/317 |
| 623,416 | 4/1899 | McCrory | 285/320 X |

FOREIGN PATENTS OR APPLICATIONS

| | | | |
|---|---|---|---|
| 689,601 | 4/1965 | Italy | 285/111 |

*Primary Examiner*—Dave W. Arola
*Attorney*—Robert E. Burns and Emmanuel J. Lobato

[57] ABSTRACT

A connect-and-disconnect coupling for connecting a hose to a pipe, comprising a female coupling element having a tapered socket threaded to receive a tapered or conical male nozzle. The male nozzle has a plurality of pivotally mounted arms provided with hooked free ends that automatically hook over an outer collar on the female coupling element as the male nozzle is inserted into the socket and the tip thereof seats on a C-shaped annular seal in the female coupling element. The hooked arms hold the nozzle and female coupling element releasably in fixed relative axial positions.

3 Claims, 4 Drawing Figures

PATENTED OCT 24 1972 3,700,112

HOSE COUPLING

This invention relates generally to couplings and more particularly to a hose coupling for coupling a hose to a conduit or pipe.

Hose couplings are known for coupling a hose to a conduit. Generally these couplings are threaded with a pipe thread complementary to the pipe to which they are connected. Other hose couplings are known in which a manually operated release element is used for coupling in a releasable manner a nozzle into a socket and to hold them fixed axially relative to each other.

A principal object of the present invention is to provide a connect-and-disconnect coupling for connecting a hose to a pipe in a quick and positive manner.

Another object is to provide a hose coupling which automatically and releasably holds a male nozzle in a female socket in relatively fixed axial positions other than relying simply on a threaded connection.

Still another object of the present invention is to provide a hose coupling in which a packing or a seal is provided for making a fluid-tight seal in the coupling and in which the seal has a construction and is disposed to make minimal contact with the fluid flowing through the coupling so as to improve its life.

Other objects and advantages of the hose coupling in accordance with the present invention will be better understood from the following description of a preferred embodiment thereof with reference to the appended claims and accompanying drawings in which:

Figure 1:
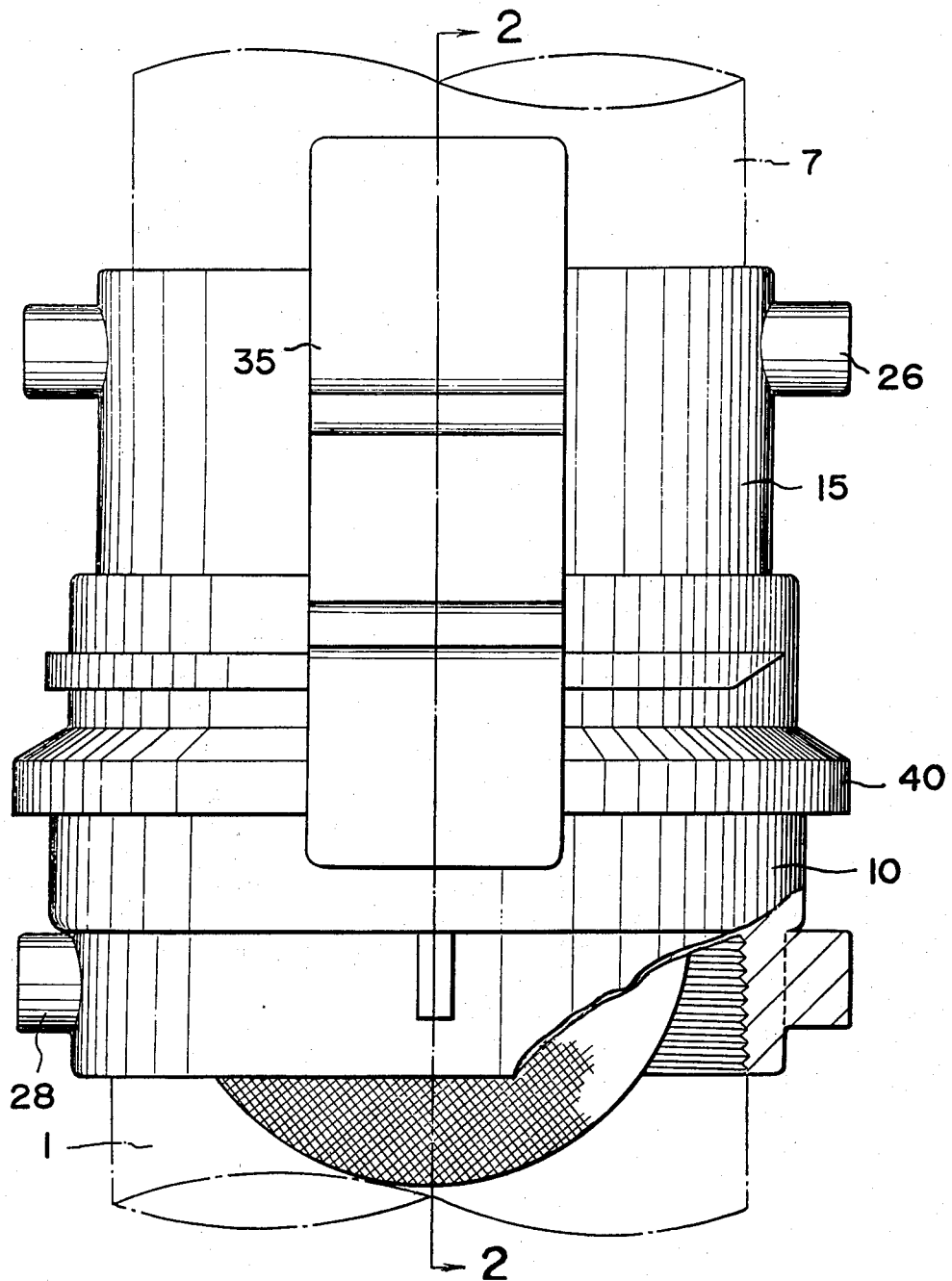
FIG. 1 is a side elevation view, partly in section, of a hose coupling according to the invention.

While the invention will be described hereinafter as applied to a hose for delivering gasoline or some such fuel from a fuel truck to a stationary tank it was understood that the coupling, according to the invention can be used other than applied to gasoline trucks.

In accordance with the drawing an inlet conduit or pipe 1 is provided on an underground gasoline tank 2 to which is connected a gasoline pump 3. The gasoline tank is assumed to be at a gasoline station to which a gasoline truck 5 delivers the gasoline from a tank 6 through a hose 7 provided with a coupling 9 according to the invention.

The hose coupling 9 comprises a female coupling element 10 having a tapered socket 11 as illustrated in the drawings. The female coupling is provided with an annular groove 13 within which is disposed an annular seal or ring 15 having a C-shaped cross-section receiving within a groove therein a flange 16 of a gasoline filter or sieve 17. The female coupling element is tubular with an axial bore therein and has an inner thread 20 for threading it onto a complementary thread of the pipe 1 as illustrated in FIG. 1.

In order to connect the hose 7 to the female coupling the free end of the hose is provided with a male nozzle 25 which is tapered or conical and externally free of threads with a complementary taper to the taper on the socket. The male nozzle is inserted into the socket and provided with lugs 26 for handling thereof. The female coupling element is provided with lugs or ears 28 engaged by a spanner, not shown, for threading it on the pipe 1.

The body of the male nozzle is internally threaded as shown for connection to a rotatable connection, not shown, to the hose in known manner and is provided with lugs 30, 31 on which are mounted pivots 32, 33 pivotally mounting thereon two arms 35, 36. Each of the arms is provided with a free end 35a, 36a each provided with a respective hook 35b, 36b which which engages on the underside of a collar 40 circumferentially of the outside of the female coupling.

Each free end has a camming surface 35c, 36c which engages a slanted cam surface 42 on the upper side of collar for camming the arms as later explained hereinafter. The free ends of the individual arms provided with the hooks as described above are biased in the direction of the longitudinal axis of the coupling by biasing springs 44, 45.

Figure 2:
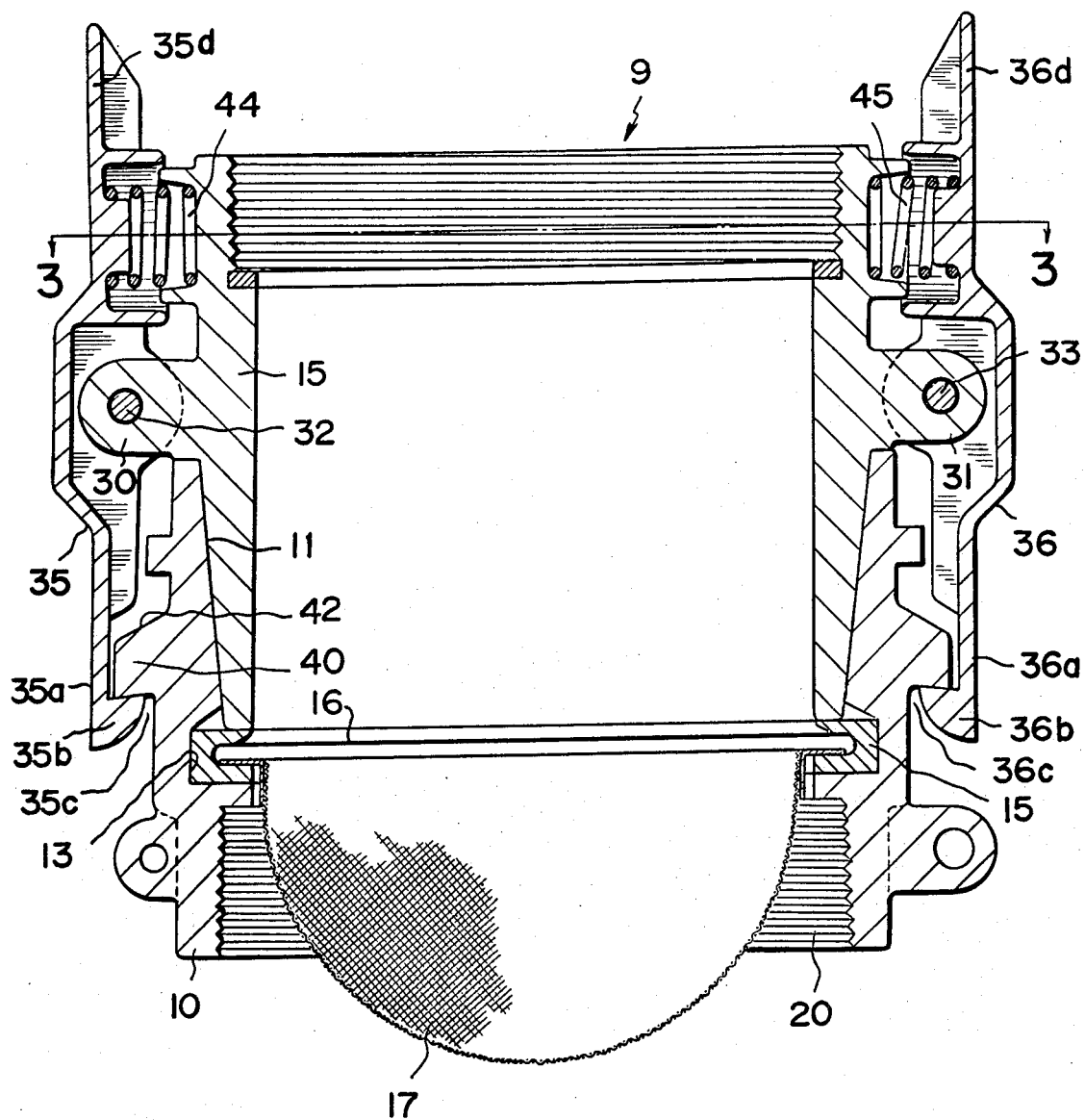
FIG. 2 is a longitudinal section view taken along section line 2—2 of FIG. 1.
Figure 3:
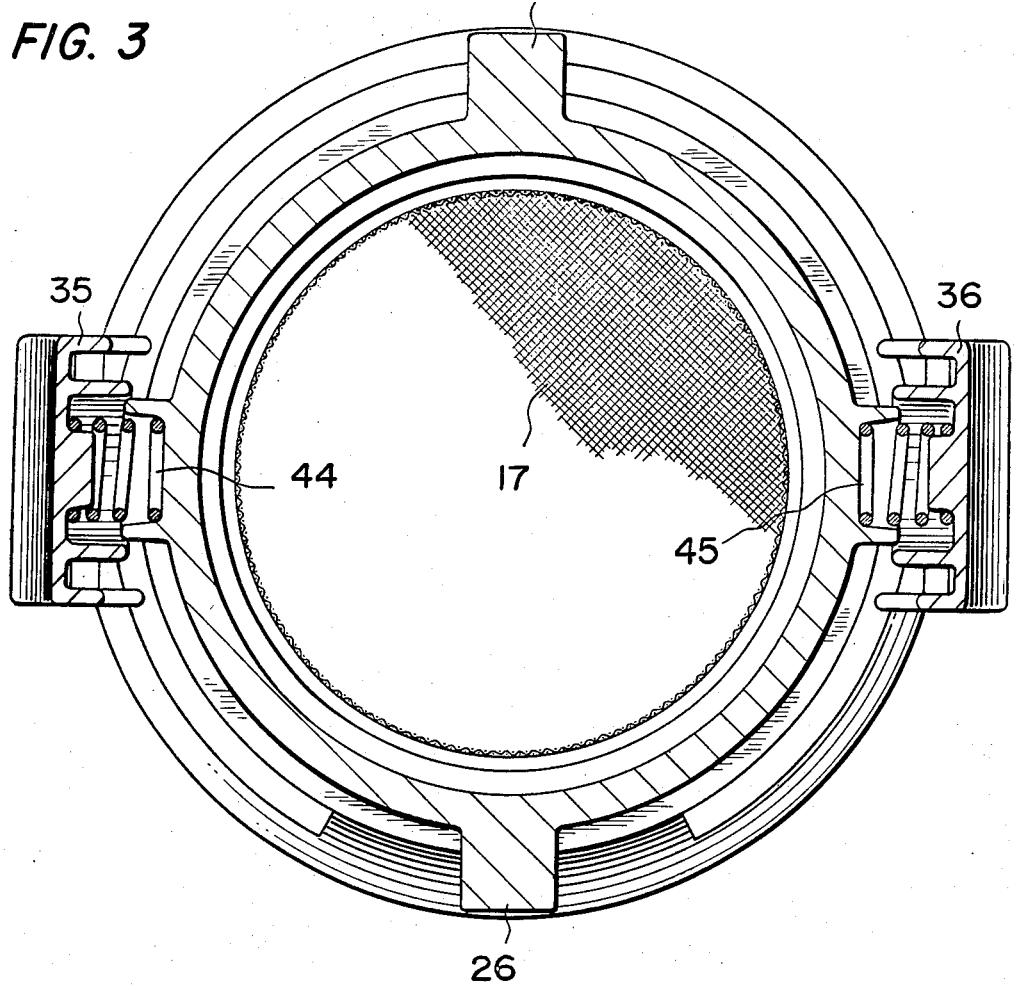
FIG. 3 is a cross-section view taken along section line 3—3 of FIG. 2.
Figure 4:
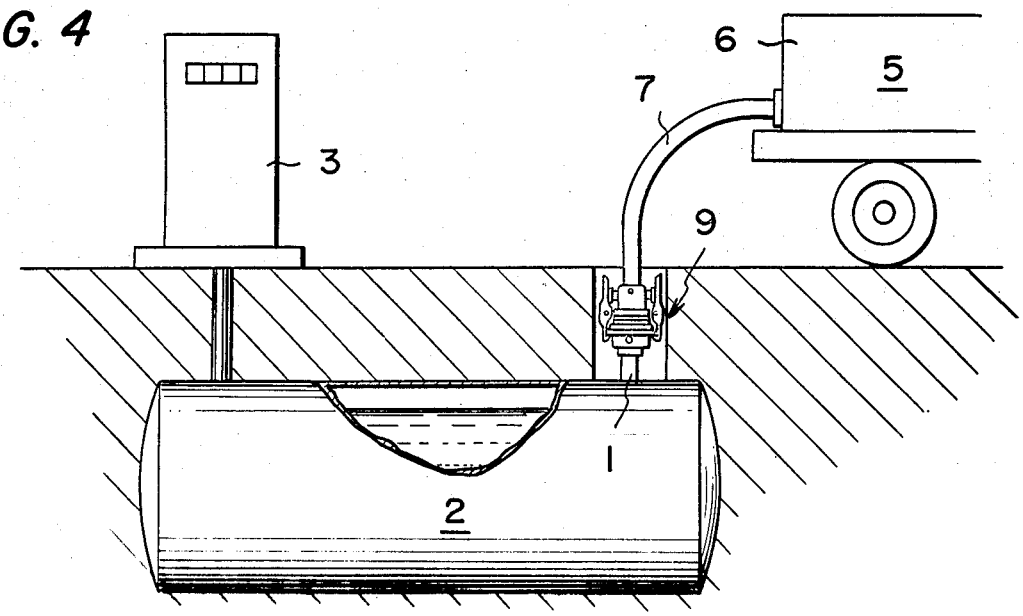
FIG. 4 is a schematic view illustrating an application of the invention.

When the male nozzle is received in the female socket and is inserted therein as the male nozzle moves axially toward the pipe 1 and within the socket it can be seen that the free ends of the two arms will have the cam surfaces thereon engage the camming or operating surface 42 and move the arms outwardly away from the longitudinal axis of the device so that the male nozzle can be inserted into its assembled position in which the hooks are automatically restored by the respective springs or moved toward the axis of the device so that the hooks engage on the underside of the collar as illustrated in the drawing in FIG. 2.

In its fully inserted position an annular tip 50 of the male nozzle rests on the C-shaped seal 15 and effects a fluid type seal therebetween so that there is no leakage and minimal contact with the gasoline by the seal. The tip of the nozzle flexes the upper arm of the C-shaped seal so that it moves downwardly so that the tip engages a greater sealing surface than would be the case if the packing were merely compressed.

The two arms hold the nozzle and socket in relative axial positions so that they are axially fixed and may be readily releasably disconnected by depressing the opposite ends 35d, 36d of the two arms toward the axis of the device so that the lower hooks are disengaged from the collar on the female coupling element and the nozzle and socket can be disconnected.

What I claim and desire to be secured by Letters Patent is:

1. A connect-and-disconnect coupling for releasably coupling two conduits comprising, a female coupling element connected in use to a first conduit and having an internally tapered socket, a tapered, male nozzle insertable axially in the tapered socket and connected in use to a second conduit, a plurality of arms pivotally mounted on said male nozzle having hooked free ends each provided with a hook for releasably hooking the female coupling element and releasably holding it in axially fixed position relative to the male nozzle, means mounting each of said arms individually pivotal spaced circumferentially on said male nozzle, biasing means biasing the free ends of each arm individually in a direction toward a longitudinal axis of said male nozzle, projecting means on said female coupling element projecting outwardly therefrom releasably hooked by hooks on the free ends of said arms, each hooked free end having a cam surface engaged by said projecting means when said male nozzle is inserted into said nozzle a given axial extent for camming the free ends of the arms away from said male nozzle and automatically hooking the free end hooks onto said projecting means under control of said biasing means when the hooks on the free ends move axially past the projecting means, said male nozzle having an annular tip, said female coupling member having an annular groove adjacent the base of said socket, a resilient annular seal having a C-shaped cross section disposed in said annular groove coaxial with said socket in said female coupling element, said C-shaped seal having in cross-section a pair of spaced arms integrally joined to an interconnecting portion, said annular tip engaging one of said spaced arms only along an annular area disposed on the inner peripheral portion of said one arm of said C-shaped seal which is spaced inwardly from said interconnecting portion of said C-shaped seal, said annular tip engaging said annular area when said male nozzle is fully inserted axially in said socket to effect a fluid-tight seal along said annular area, said seal having an inner annular groove between said spaced arms, a filter mounted in said female coupling element having a flange with a thickness less than the minimum spacing between said spaced arms of said seal disposed in said inner annular groove of said seal, whereby when said male nozzle is inserted in said female coupling element and said arms releasably hook the female coupling element, said tip of said nozzle flexes said one arm of said seal toward said other arm so that as said one arm flexes, said tip engages a greater sealing surface than would be the case if the seal were only compressed, whereby a fluid tight seal is effected in the coupling and there is minimal contact between the seal and the fluid passing through the coupling.

2. A connect-and-disconnect coupling for releasably connecting two conduits according to claim 1, in which each of said arms has an end opposite to its free end movable in a direction toward said axis for releasing each hook of each free end from the female coupling element.

3. A connect-and-disconnect coupling for releasably connecting two conduits according to claim 3, in which said projecting means comprises a collar on said female coupling element.

* * * * *